United States Patent
van Haag et al.

[11] Patent Number: 5,980,438
[45] Date of Patent: *Nov. 9, 1999

[54] ADJUSTABLE DEFLECTION ROLL

[75] Inventors: Rolf van Haag, Kerken; Peter Dornfeld, Krefeld, both of Germany

[73] Assignee: Voith Sulzer Finishing GmbH, Krefeld, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/844,681

[22] Filed: Apr. 21, 1997

[30] Foreign Application Priority Data

Apr. 24, 1996 [DE] Germany .............................. 196 16 275

[51] Int. Cl.⁶ ...................................................... B23P 15/00
[52] U.S. Cl. .................................... 492/7; 492/16; 492/20
[58] Field of Search ..................................... 492/7, 16, 20

[56] References Cited

U.S. PATENT DOCUMENTS

| | | | |
|---|---|---|---|
| 5,628,717 | 5/1997 | Van Haag | 492/7 |
| 5,645,517 | 7/1997 | Stotz | 492/7 |
| 5,662,570 | 9/1997 | Stotz | 492/7 |
| 5,662,571 | 9/1997 | Brandiser et al. | 492/7 |
| 5,679,107 | 10/1997 | Autrata et al. | 492/7 |

FOREIGN PATENT DOCUMENTS 0451470  10/1991  European Pat. Off. .

*Primary Examiner*—Irene Cuda
*Attorney, Agent, or Firm*—Greenblum & Bernstein, P.L.C.

[57] ABSTRACT

An adjustable deflection roll including a roll sleeve or jacket supported by a plurality of support devices positioned partially within a support beam. Pressure chambers may be located between the support devices and the support beam and each pressure chamber may be coupled to a supply line. As the length of the roll increases, and as the need for increasingly more precise pressure distributions also increases, more support devices may be utilized. The adjustable deflection roll may also include a drain channel to facilitate quick relief of the pressure chambers when necessary. To accomplish this, each pressure chamber may be coupled to the drain channel furnished with the supply line such that the drain channel may be closed with a drain valve.

27 Claims, 3 Drawing Sheets

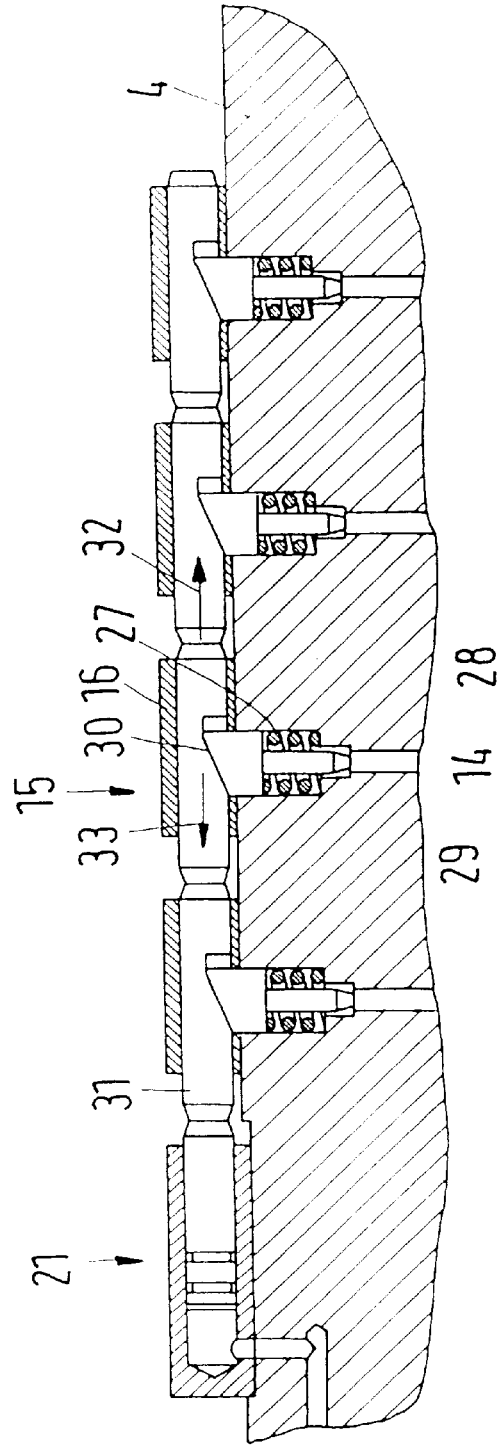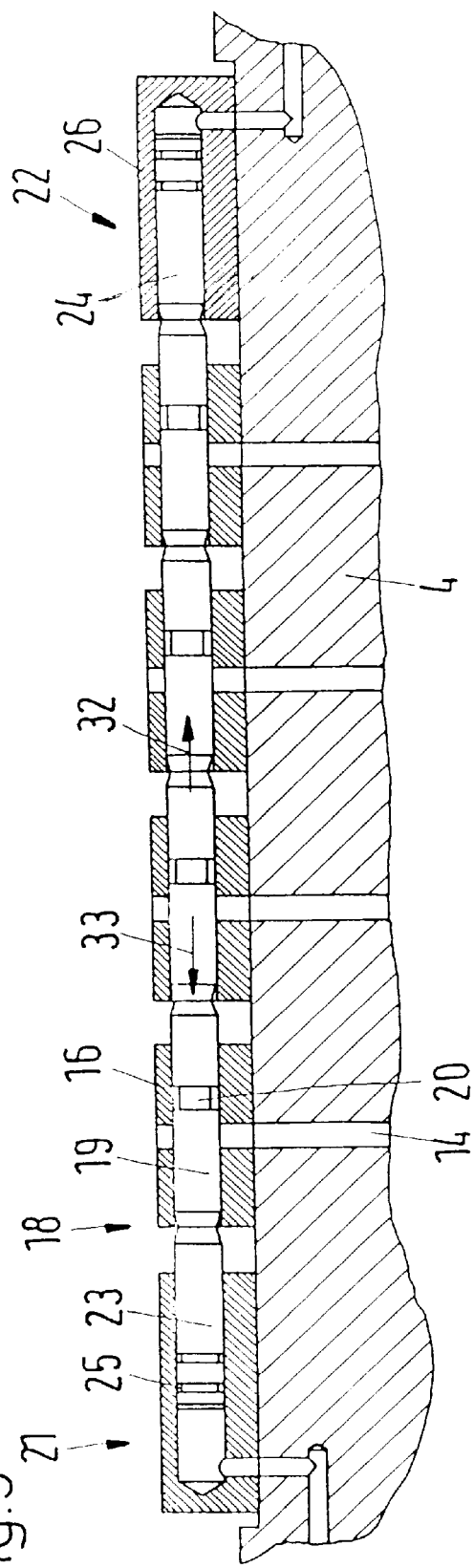

ADJUSTABLE DEFLECTION ROLL

CROSS-REFERENCE OF RELATED APPLICATION

The present invention claims the priority under 35 U.S.C. §119 of German Patent Application No. 196 16 275.0 filed on Apr. 24, 1996, the disclosure of which is expressly incorporated by reference herein in its entirety.

BACKGROUND OF THE INVENTION

1. Field of the Invention

The present invention relates to an adjustable deflection roll having a roll sleeve supported on a support beam by a plurality of support devices or units. The support devices may include pressure chambers, positioned between a respective support device and the support beam, and each pressure chamber may be coupled to a supply line.

2. Discussion of Background Information

Adjustable deflection rolls similar, in general, to the roll discussed above may also be referred to as bending-adjusting rolls and may be used in roll machines, e.g., calenders or glazing rolls, to exert pressure on a continuous sheet of material, e.g., paper. In use, the adjustable deflection roll and a paper cylinder form a roll gap or nip through which the material sheet is guided. To maintain an application of pressure in as even a manner as possible across a width of the roll gap, i.e., transverse to a feed direction of the material sheet, the support units are designed to adjust pressure conditions along the extent of the roll gap. The support units, which are pressurized by a hydraulic fluid, e.g., hydraulic oil, may be of conventional design in the art.

To distribute the pressure as precisely, and evenly, as possible, it is desirable to control the support devices individually or at least in small groups. For this purpose, a large number of supply lines is required. Of course, as the number of supply lines increases, the width of the rolls correspondingly increases. Further, the supply lines have to be routed through the support beam. However, because there is only limited space available, cross sections of individual supply device should not exceed a certain predetermined value. For example, larger cross sections would adversely effect the support device, e.g., weaken the support device, such that it would be unable to perform its requisite support functio.

While the above-noted drawbacks do not generally lead to problems in control of pressure distribution, problems do arise in the so-called quick release processes of the roll machines. That is, the hydraulic fluid in rolls exhibiting sleeve lift, i.e., the support devices exert an upward pressure on the inside of the roll sleeve or jacket, has to be removed from the pressure chambers as quickly as possible, e.g., to relieve the support units or to quickly lower the roll sleeve. However, quick release processes cannot be satifactorily achieved due to small diameters of the supply lines.

SUMMARY OF THE INVENTION

An object of the present invention may be to facilitate rapid discharge of the pressure chambers while ensuring a precise distribution of pressure.

This object may be achieved with an adjustable deflection roll of the type discussed above, in which each pressure chamber may be coupled to a supply line and to a drain channel. The drain channel may be closable with a drain valve.

Thus, in accordance with the present invention, pressure release is no longer dependent upon the supply line. Instead, a hydraulic fluid may be removed from the pressure chamber through the drain channel. To ensure that fluid removal occurs only desired, i.e., not during normal roll operation, a drain valve may be utilized to precisely control discharging pressure from the pressure chambers.

The drain channel may preferably lead into a reservoir formed between the roll sleeve and the support beam. Oil that reaches the reservoir, e.g., via hydrostatic support devices, may be continuously drained from the pressure chamber so that the reservoir between the roll sleeve and the support beam may not be filled with oil, and thus, may remain, for the most part, depressurized. Therefore, when the drain valve is opened, the pressurized oil may be pushed out of the pressure chamber and into the reservoir between the roll sleeve and support beam. A preceding pressure reduction, as would otherwise be necessary in the supply lines, is not required by the present invention.

It may be preferred that provide the drain channel with a lower flow resistance than the supply line. This may generally be accomplished by designing the drain channel to have a shorter length than the supply line. In addition, the drain channels may be designed to have a larger cross sectional flow area than the supply line.

Each pressure chamber may preferably have its own supply line and its own drain channel. Alternatively, it may be sufficient to combine individual support devices and, thus, to group individual pressure chambers and to control the support devices in groups. However, it is easier to control the pressure distribution along the width of the deflection roll if each support device is equipped with its own supply line. Further, the pressure release may occur at a higher speed in individually supplied support devices because the hydraulic fluid may be directly drain from each pressure chamber.

The drain channel may preferably branch out from an intermediate channel formed between the pressure chamber and the supply line. Thus, design modifications in an area of the pressure chamber may not be required. In particular, flow conditions that have proven effective may be left unchanged. Further, it may only be necessary to route an additional channel into the support beam.

It may be advantageous to configure the drain valves such that at least a portion of their bodies lie on an exterior of the support beam. This configuration may simplify the manufacturing process. In particular, movable parts may be placed in one housing that is mounted on an outside of the support beam, thus, avoiding extensive modifications to the support beam.

It may be especially advantageous to offset the drain valves by approximately 90° relative to a position of the support devices. In this position, the drain valves may cause the least possible hindrance to a lifting motion of the roll sleeve because there is practically no restriction on the motion of the roll sleeve.

Each drain valve may be actuated at the same time. Thus, when a quick release procedure is required, one command may be sufficient to induce or actuate the pressure release from each of the pressure chambers.

It may be particularly advantageous if each drain valve has a common actuating device. This actuating device may then ensure that actuation of the drain valves by, e.g., by a mechanical actuation, may be synchronized.

The actuating device may be designed as a slider. A slider of the sort contemplated by the present invention may be easily mounted on the support beam and may be actuated from one end. This arrangement may particularly hold true when the slider is arranged to move substantially parallel to an axis the support beam. Such axial motion may be easily controllable from one of the axial ends of the support beam.

The slider may be preferably driven by a piston-cylinder device. A piston-cylinder device of this type may also be operated with the hydraulic fluid that utilized in the adjustable deflection roll. Accordingly, no additional pressure generating mechanisms may be needed.

An alternative slider, which may be designed as a piston located at least on one end of the roll, may be arranged to slide inside a cylinder, is particularly advantageous. This particular alternative may facilitate the manufacturing process. That is, no connection may be required between the slider and the piston of the piston-cylinder unit because it is already provided by the slider itself. Further, the piston may be designed as a plunger piston.

The drain valves may be preferably designed as sliding valves with valve sliders. A flow path may be opened by pushing a through-hole in the valve slider over a corresponding opening of the drain channel. When these two openings do not align, the drain valve is closed. Such a valve design is easily constructed and it also relatively easy to actuate.

In another alternative, the valve sliders of the drain valves may be preferably attached to each other in the axial direction. This renders unnecessary a separate slider and the valve slider becomes the actuating device.

In a different embodiment, each drain valve may exhibit a stopper that may be moved into an opening of the drain channel. There the stopper either may come to rest on a front surface to create a seal, or may be guided into the opening to act as a plug and provides an adequate seal. An absolute seal may not be required in most instances because the support devices themselves exhibit a certain leakage.

It may be preferred that the sliders act on the stoppers through an inclined plane. The axial movement may then be easily converted into a radial movement of the stoppers.

The drain valves may be preferably designed as self-opening valves. This may provide an additional safety feature. For example, if an outage in the supply unit occurs, and no pressure is available in the piston-cylinder unit, the valves open, causing a quick release of the calender roll. If the valves were controlled in an opposite manner, such a quick release could not be guaranteed after an outage of the supply system.

Accordingly, the present invention may be directed to an adjustable deflection roll that may include a roller sleeve; a support beam including a plurality of support devices; the plurality of support devices supporting the roller sleeve; an pressure chamber positioned between the support devices and the support beam; a supply line coupled to each pressure chamber; a drain channel coupled to each pressure chamber; and a drain valve for closing each of the drain channels.

According to a further feature of the present invention, a reservoir may be formed between the roll sleeve and the support beam and the drain channel may lead into the reservoir According to a further feature of the present invention, the drain channel may exhibit a lower flow resistance than the supply line.

According to another feature of the present invention, each pressure chamber may include a respective supply line and a respective drain channel.

According to still another feature of the present invention, an intermediate channel may be formed between the pressure chamber and the supply line and the drain channel may branch from the intermediate channel.

According to a further feature of the present invention, the drain valves, which may include drain valve bodies, may be mounted with at least a portion of the drain valve bodies on an exterior of the support beam.

According to a still feature of the present invention, the drain valve may be offset approximately 90° from a position of the support unit.

According to a another feature of the present invention, each of the drain valves may be actuated at a same time. Further, a common actuating device may be utilized for actuating each of the drain valves.

According to a further feature of the present invention, the common actuating device may include a slider. Further, the slider may be movable substantially parallel to an axial direction of the support beam.

According to a another feature of the present invention, the slider may include a piston-cylinder unit for driving the common actuating device. Further, at least one end of the slider may include a piston arranged for sliding within a cylinder.

According to a still further feature of the present invention, the drain valves may include slide valves having valve sliders. Further, the valve sliders may be coupled to each other in an axial direction.

According to still another feature of the present invention, each drain valve may include a movable stopper movable into an opening of the drain channel. Further, the slider may act on the stoppers through an inclined plane.

According to yet another feature of the present invention, the drain valves may include self-opening valves.

The present invention may be directed to an adjustable deflection roll that may include a support beam; at least one fluid supply line for supplying a fluid; at least one pressure chamber formed in the support beam coupled to the at least one fluid supply line; and a drain valve coupled to the support beam for draining fluid from the at least one pressure chamber.

According to another feature of the present invention, at least one intermediate channel may couple the at least one fluid supply line to the at least one pressure chamber and at least one drain channel may couple the at least one intermediate channel to the drain valve.

According to another feature of the present invention, the drain valve may be coupled to a plurality of drain channels and the drain valve may selectably closing each drain channel at a same time.

According to another feature of the present invention, the drain valve may include a common valve slider that is slidable within a plurality of spaced valve bodies and each of the spaced valve bodies may be coupled to an exterior portion of the support beam.

According to still another feature of the present invention, a cylinder may be coupled to the exterior portion of the support beam, the common valve slider may include a plurality of notched sections spaced to correspond with each of the drains channels, and the common valve slider may be actuatable by a piston/cylinder arrangement. An end of the common valve slider may include a piston engagable with the cylinder.

According to a further feature of the present invention, a radially actuatable stopper may be associated with each drain channel, the drain valve may include a slider, and each stopper may be actuated at a same time by the slider.

According to a still further feature of the present invention, each stopper may include an angled portion for contacting the slider and the slider may include a complementary angled portion corresponding to each angled portion of the stoppers.

Other exemplary embodiments and advantages of the present invention may be ascertained by reviewing the present disclosure and the accompanying drawing.

BRIEF DESCRIPTION OF THE DRAWINGS

The present invention may be further described in the detailed description with follows, in reference to the noted plurality of drawings by way of non-limiting examples of preferred embodiments of the present invention, in which like reference numerals represent similar parts throughout the several views of the drawings, and wherein:

FIG. 3 illustrates a first embodiment of the drain valves according to the present invention; and FIG. 4 illustrates a second embodiment for the drain valves according to the present invention.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the invention may be embodied in practice.

Figure 1:
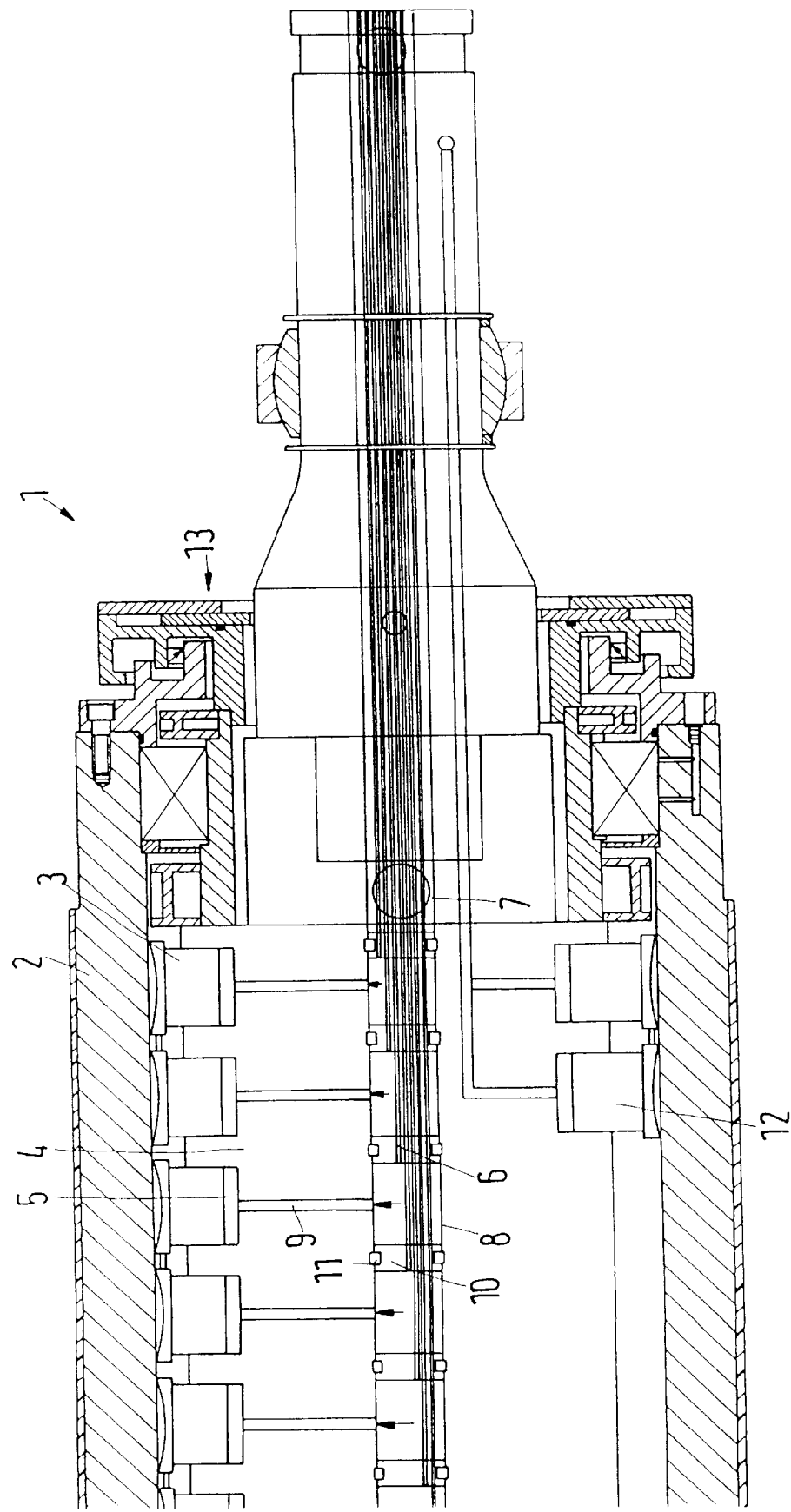
FIG. 1 illustrates a schematic axial portion of an adjustable deflection roll.

FIG. 1 illustrates an end portion of an adjustable deflection roll 1. Adjustable deflection roll 1 may include a roll sleeve or jacket 2 supported by a plurality of support devices 3 on a support beam 4. Support beam 4 may also be referred to as an axle of adjustable deflection roll 1. In this particular case, adjustable deflection roll 1 may be designed as a sleeve lift roll, i.e., support devices lift or raise roll sleeve 2 by exerting a pressure on an inside surface of roll sleeve 2.

Each support device 3 may include a pressure chamber 5 that may be individually pressurized with pressure fluid, e.g., hydraulic oil. Pressure chamber 5 may be positioned between support device 3 and support beam 4. For this purpose, a supply line 6 may be provided for each pressure chamber 5. The pressure in the pressure chambers 5 may be regulated by supply lines 6, which may be formed into a bundle of conduits 7 that may be housed in a main boring 8 of support beam 4.

Figure 2:
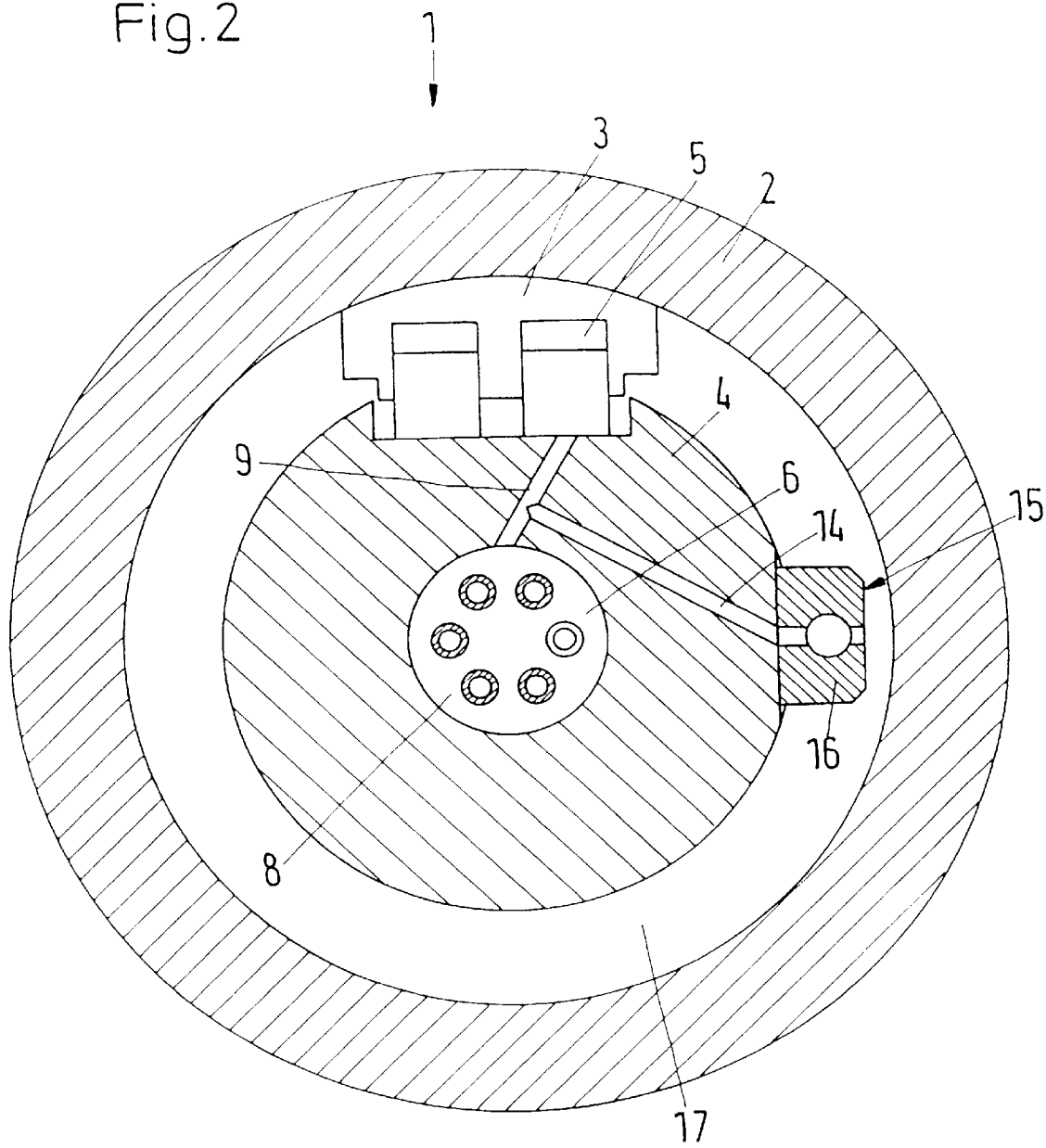
FIG. 2 illustrates a schematic cross section of the adjustable deflection roll.

Main boring 8 may be coupled to pressure chambers 5 via intermediate channels 9. To enable individual control of each pressure chamber 5, partitioning walls 10 having seals 11 may be respectively arranged in main boring 8 between openings of intermediate channels 9. A respective supply line 6, i.e., associated with intermediate channel 9, may end at each partitioning wall 10. FIG. 2 illustrates a cross-section of the adjustable deflection roll through one of the intermediate channels, and, thus, does not show an end of a supply line.

Counter units 12 may be located on a side of the adjustable deflection roll opposite support units 3. Counter units 12 may be pressurized, e.g., with hydraulic fluid, to enable a faster lowering of roll sleeve 2 and to relieve stresses on the roll ends.

Movable arrays of seals and bearings, as are generally known from adjustable rolls utilizing sleeve lift, may be fitted onto the end of the rolls.

As depicted in FIG. 2, a drain channel 14, which may be closed via a drain valve 15, may branch off of intermediate channel 9. Drain valve 15 may be, e.g., as shown in the figure, depicted in the open position.

Drain valve 15 may include a valve housing 16 mountable on an outside of support beam 4. Drain valve 15 may be offset, e.g., approximately 90° relative to support unit 3. Thus, when roll sleeve 2 is lowered, drain valve 15 does not interfere with the lowering, even if it is mounted on the exterior of support beam 4, as shown.

When drain valve 15 is opened, drain channel 14 leads or empties into a reservoir or annulus 17 between roll sleeve 2 and support beam 4. Oil and other hydraulic fluid may flows continuously into reservoir 17, particularly when the adjustable deflection roll utilizes hydrostatic support units 3, and the fluid must be removed to lower roll sleeve 2. Since oil may be continuously drained from, or pumped out of, reservoir 17, the pressure prevailing within reservoir 17 may be practically tank pressure. Therefore, hydraulic fluid that may be pushed out of pressure chamber 5 through drain channel 14 may drain, i.e., substantially without back pressure, into reservoir 17.

Drain channel 14 may be relatively short because it is only necessary that it extend from intermediate channel 9 to reservoir 17, i.e., to the circumferential outer wall of support beam 4. Accordingly, even if a cross section of drain channel 14 is as big as a cross section of a supply line 6, the flow resistance through drain channel 14 is substantially lower due to the shorter length of travel. Thus, as soon as drain valve 15 is opened, the hydraulic fluid may escape quickly from the pressure chambers 5.

Support units 3 may be generally known to those ordinarily skilled in the art. Thus, for the sake of clarity, supply lines and throttles generally associated support unit such as support unit 3 have not been depicted in the drawings. Thus, support unit 3 may e.g., include an annular piston so that pressure chamber 5 may also include an annular shape. Alternatively, support unit 3 may also include two pistons, as shown in FIG. 2, or may utilize a design such as depicted in FIG. 1. However, the precise design of individual support units 3 is up to the system designer or engineer. However, in accordance with the present invention, it is necessary that the hydraulic fluid, utilized to pressurize support unit 3 during normal operation, may quickly escape through drain channel 14 and drain valve 15 upon quick release of the adjustable deflection rolls.

FIGS. 3 and 4 illustrate exemplary designs for drain valve 15. A first embodiment of a drain valve, shown in FIG. 3, may be designed as a sliding valve 18. In FIG. 3, the position of sliding valve 18 is illustrated as closed.

Each sliding valve 18 may include a common valve slider 19 having a through-hole 20 for each drain valve. With valve slider 19 in the position shown in FIG. 3, through-holes 20 are not aligned with drain channel 14, thus closing and sealing the end of drain channel 14, i.e., the hydraulic fluid cannot drain through or around common valve slider 19. Acting together with common valve slider 19, a valve housing 16 may seal or close the opening of drain channel 14. However, by sliding common valve slider 19 in a direction 33, through-hole 20 may be moved to align with drain channel 14 and enable the free flow of hydraulic fluid pressure chamber 5.

Valve sliders 19 may be driven by two piston-cylinder units 21, 22 located at each axial end of the common valve slider 19. The common valve slider 19 may be modified on both ends so that common valve slider 19 itself may act as piston 23, 24, which is positioned within a cylinder 25, 26, respectively. When cylinder 25, i.e., piston-cylinder unit 21, is pressurized, common valve slider 19 may be shifted toward the right, i.e., in direction 32, to close slider valves 18. When cylinder 26, i.e., piston-cylinder unit 22, is pressurized, common valve slider 19 may be shifted to the left, in direction 33, to opens drain valves 15 (slider valves 18). The same hydraulic fluid used to raise or adjust the pressure of support units 3 may be utilized to actuate piston-cylinder units 21, 22.

Instead of piston-cylinder unit 22, which may be used to open sliding valves 18, a spring may be utilized that opens sliding valves 18 when a pressure in piston-cylinder unit 21 is lowered. Thus, sliding valves 18 may be automatically opened in the absence of this hydraulic pressure.

FIG. 4 illustrates an alternative design for drain valves 15 which may include a stopper 27 that may be guided into opening of drain channel 14 in the manner of a reciprocating plug. FIG. 4 illustrates drain valves 15 in an open position. Stopper 27 may be pushed into its open position by a pressure spring 28 and hydraulic fluid may be drained from drain channel 14, i.e., around stopper 27 into a chamber 29, from which it reaches the reservoir 17 between roll sleeve 2 and support beam 4 in a manner that is not illustrated here.

Stopper 27 may be actuated by an inclined plane 30 formed within slider 31 that may slide substantially parallel to support beam 4 in an axial direction, e.g., as shown by arrows 32, 33. When slider 31 is moved in a direction of arrow 32, drain valves 15 are closed. Conversely, when slider 31 is moved in a direction of arrow 33, drain valves 15 are opened.

To close the drain valves 15, a left end of slider 31 may be equipped with a piston-cylinder unit 21 which may be pressurized with hydraulic fluid, i.e., in a manner similar to that discussed with regard to FIG. 3. When slider 31 is then moved to the right, the inclined surfaces 30 of slider 31 and stopper 27 move stopper 27 radially inward, thus, closing the opening of drain channel 14.

In an alternative embodiment, stopper 27 may also act on a front surface that surrounds the opening of drain channel 14. However, the valve arrangement illustrated in FIG. 4 may also guarantees a good seal of drain valve 15.

Common valve stopper 13 is depicted in FIG. 3, as well as the slider 31 in FIG. 4 may include several, similarly designed parts. In particular, the parts may be screwed together. If necessary, spacing pieces could be positioned between individual slider parts. With this configuration, the mechanical connection of the individual parts ensures that all valves 15, 18 may be opened and closed at a same time.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. An adjustable deflection roll comprising:

a roller sleeve;

a support beam including a plurality of support devices;

the plurality of support devices supporting the roller sleeve;

pressure chambers positioned between the support devices and the support beam;

a supply line coupled to each pressure chamber;

a drain channel coupled to each pressure chamber;

a reservoir formed between the roller sleeve and the support beam;

the drain channels connecting each pressure chamber to the reservoir; and a drain valve coupled to the support beam for closing each of the drain channels.

2. The adjustable deflection roll according to claim 1, the drain channel exhibiting a lower flow resistance than the supply line.

3. The adjustable deflection roll according to claim 1, each pressure chamber comprising a respective supply line and a respective drain channel.

4. The adjustable deflection roll according to claim 1, further comprising an intermediate channel formed between the pressure chamber and the supply line and the drain channel branching from the intermediate channel.

5. The adjustable deflection roll according to claim 1, the drain valves, comprising drain valve bodies, being mounted with at least a portion of the drain valve bodies on an exterior of the support beam.

6. The adjustable deflection roll according to claim 1, the drain valve being offset approximately 90° from a position of the support devices.

7. The adjustable deflection roll according to claim 1, each of the drain valves being actuated at a same time.

8. The adjustable deflection roll according to claim 7, further comprising a common actuating device for each of the drain valves.

9. The adjustable deflection roll according to claim 8, the common actuating device comprising a slider.

10. The adjustable deflection roll according to claim 9, the slider being movable substantially parallel to an axial direction of the support beam.

11. The adjustable deflection roll according to claim 9, the slider comprising a piston-cylinder unit for driving the common actuating device.

12. The adjustable deflection roll according to claim 11, at least one end of the slider comprising a piston arranged for sliding within a cylinder.

13. The adjustable deflection roll according to claim 1, the drain valves comprising slide valves having valve sliders.

14. The adjustable deflection roll according to claim 13, the valve sliders coupled to each other in an axial direction.

15. The adjustable deflection roll according to claim 1, each drain valve comprising a movable stopper movable into an opening of the drain channel.

16. The adjustable deflection roll according to claim 15, the slider acting on the stoppers through an inclined plane.

17. The adjustable deflection roll according to claim 1, the drain valves comprising self-opening valves.

18. The adjustable deflection roll comprising:

a support beam;

at least one fluid supply line for supplying a fluid;

at least one pressure chamber formed in the support beam coupled to the at least one fluid supply line; and a drain valve coupled to the support beam for draining fluid from the at least one pressure chamber.

19. The adjustable deflection roll according to claim 18, further comprising at least one intermediate channel coupling the at least one fluid supply line to the at least one pressure chamber; and at least one drain channel directly connecting the at least one intermediate channel to the drain valve.

20. The adjustable deflection roll according to claim 19, the drain valve coupled to a plurality of drain channels and the drain valve selectably closing each drain channel at a same time.

21. The adjustable deflection roll according to claim 20, the drain valve comprising a common valve slider that is slidable within a plurality of spaced valve bodies;

each of the spaced valve bodies coupled to an exterior portion of the support beam.

22. The adjustable deflection roll according to claim 21, further comprising a cylinder coupled to the exterior portion of the support beam;

the common valve slider comprising a plurality of notched sections spaced to correspond to each of the drain channels;

the common valve slider actuatable by a piston/cylinder arrangement, an end of the common valve slider comprising a piston engagable with the cylinder.

23. The adjustable deflection roll according to claim 20, further comprising a radially actuatable stopper associated with each drain channel;

the drain valve comprising a slider; and each stopper being actuated at a same time by the slider.

24. The adjustable deflection roll according to claim 23, each stopper comprising an angled portion for contacting the slider; and the slider comprising a complementary angled portion corresponding to each angled portions of the stoppers.

25. The adjustable deflection roll according to claim 1, the drain channel being coupled between the supply line and the drain valve.

26. The adjustable deflection roll according to claim 18, further comprising:

a drain channel being coupled between the at least one fluid supply line and the drain valve;

a reservoir located around a periphery of the support beam; and the drain channel coupling the at least one pressure chamber to the reservoir.

27. The adjustable deflection roll according to claim 1, further comprising:

an intermediate channel formed within the support beam to couple the supply line to each pressure chamber; and the drain channel being formed within the support beam and directly connected between the intermediate chamber and the reservoir.

\* \* \* \* \*